(12) United States Patent
Attard et al.

(10) Patent No.: US 9,290,186 B2
(45) Date of Patent: Mar. 22, 2016

(54) MESSAGING VIA VEHICLE STEERING WHEEL

(71) Applicant: Ford Global Technologies, LLC, Dearborn, MI (US)

(72) Inventors: Christopher Attard, Ann Arbor, MI (US); Shane Elwart, Ypsilanti, MI (US); Jeff Allen Greenberg, Ann Arbor, MI (US); Rajit Johri, Ann Arbor, MI (US); John P. Joyce, West Bloomfield, MI (US); Devinder Singh Kochhar, Ann Arbor, MI (US); Douglas Scott Rhode, Farmington Hills, MI (US); John Shutko, Ann Arbor, MI (US); Louis Tijerina, Dearborn, MI (US); Hongtei Eric Tseng, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 124 days.

(21) Appl. No.: 14/202,846

(22) Filed: Mar. 10, 2014

(65) Prior Publication Data
US 2015/0251666 A1     Sep. 10, 2015

(51) Int. Cl.
| | |
|---|---|
| B60W 50/14 | (2012.01) |
| B60W 50/16 | (2012.01) |
| B62D 15/02 | (2006.01) |
| B62D 5/00 | (2006.01) |
| G05D 1/00 | (2006.01) |
| B60K 35/00 | (2006.01) |

(52) U.S. Cl.
CPC ............. *B60W 50/14* (2013.01); *B60K 35/00* (2013.01); *B60W 50/16* (2013.01); *B62D 5/005* (2013.01); *B62D 15/029* (2013.01); *G05D 1/0055* (2013.01); *B60K 2350/928* (2013.01); *B60W 2050/146* (2013.01)

(58) Field of Classification Search
CPC .. B62D 15/0265; B62D 15/029; B62D 1/181; B62D 5/005; B60K 28/066; B60K 35/00; B60K 2350/928; B60W 50/16; B60W 2710/20; B60W 2040/0818; B60W 50/14; B60W 2050/146; G05D 1/0055
USPC .............................................. 701/23, 41, 301
See application file for complete search history.

(56) References Cited

U.S. PATENT DOCUMENTS

| | | | | |
|---|---|---|---|---|
| 5,511,629 | A * | 4/1996 | Vogel ..................... | B62D 5/001 180/405 |
| 7,280,046 | B2 * | 10/2007 | Berg ..................... | B60K 28/066 340/407.1 |
| 8,170,751 | B2 * | 5/2012 | Lee ....................... | B62D 15/025 180/204 |
| 8,483,910 | B2 | 7/2013 | Williams et al. | |
| 8,489,281 | B2 * | 7/2013 | Reichel .............. | B62D 15/0265 701/301 |
| 2012/0173069 | A1 | 7/2012 | Tsimhoni et al. | |
| 2012/0191284 | A1 * | 7/2012 | Fehse ................ | B62D 15/0275 701/23 |
| 2012/0330509 | A1 * | 12/2012 | Kornhaas ................ | B62D 1/16 701/41 |
| 2013/0046431 | A1 * | 2/2013 | Becker ............... | B62D 15/0285 701/25 |
| 2013/0179023 | A1 | 7/2013 | Schmidt | |

* cited by examiner

*Primary Examiner* — Russell Frejd
(74) *Attorney, Agent, or Firm* — Frank A. MacKenzie; Bejin Bieneman PLC

(57) ABSTRACT

One of a condition affecting a vehicle and a planned action of the vehicle are identified. An instruction is provided to actuate movement of a steering wheel in the vehicle, wherein the movement is determined according to the one of the condition and the planned action.

18 Claims, 2 Drawing Sheets

# MESSAGING VIA VEHICLE STEERING WHEEL

BACKGROUND

A vehicle such as an automobile may include a central control unit or the like, i.e., the computing device having a processor and a memory, that receives data from various vehicle data collection devices such as sensors, and generally also external data sources such as navigation information. Further, the central control unit may then provide instructions to various vehicle components, e.g., actuators and the like that control steering, braking, acceleration, etc., to control vehicle operations without action, or with reduced action, by a human operator. Accordingly, the human operator may not be monitoring all vehicle activities or surroundings at all times. Therefore, mechanisms are desirable to inform and alert the vehicle operator about an autonomous driving system's intent to perform operations, possible road hazards, potential collisions, etc.

DRAWINGS

DETAILED DESCRIPTION

System Overview

Figure 1:
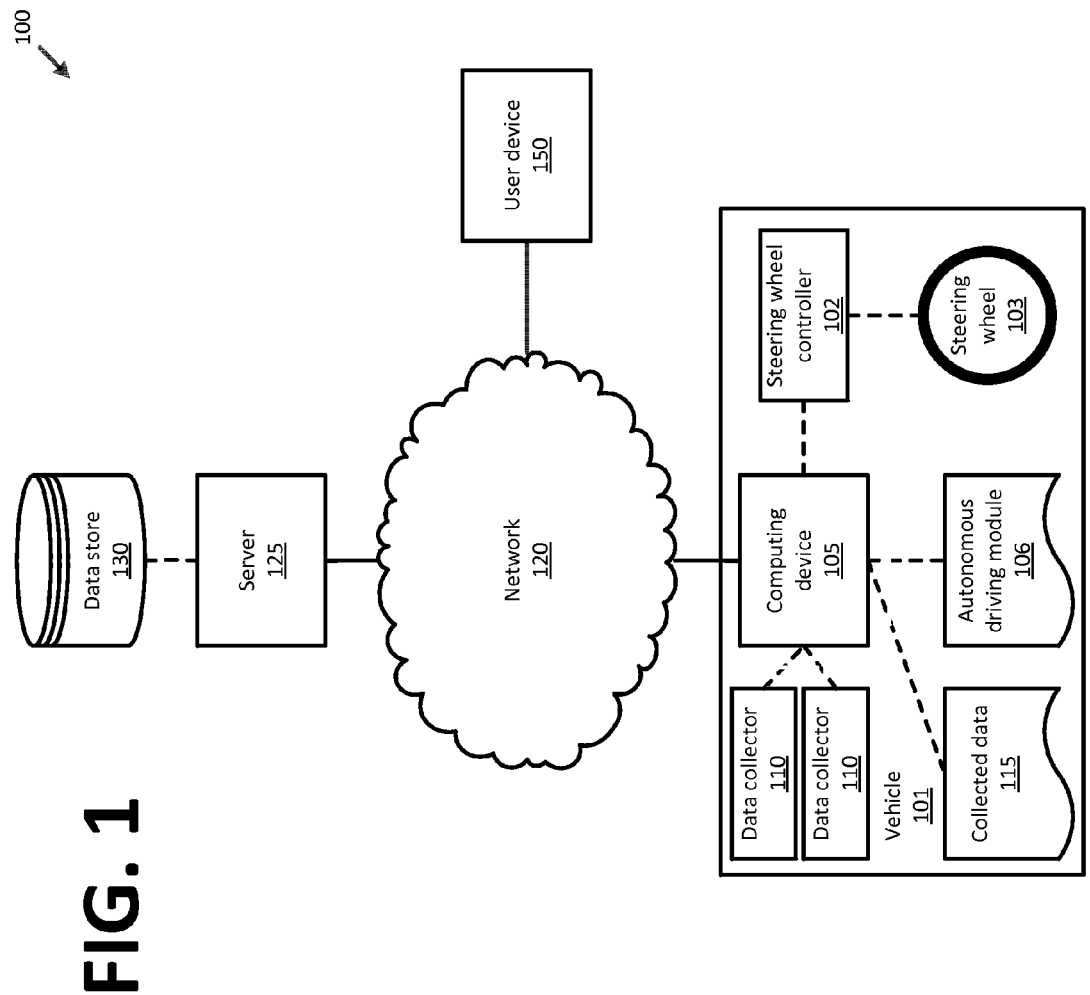
FIG. 1 is a block diagram of an exemplary vehicle system.

FIG. 1 is a block diagram of an exemplary vehicle system 100. A vehicle 101 includes a vehicle computer 105 that is configured to receive information, e.g., collected data 115, from one or more data collectors 110, e.g., sensors, in the vehicle 101. The computer 105 generally includes an autonomous driving module 106 that comprises instructions for autonomously or semi-autonomously, i.e., completely or partly without operator input, operating the vehicle 101. Further, the computer 105, e.g., in the module 106, generally includes instructions for receiving data, e.g., from one or more data collectors 110 and/or a human machine interface (HMI), such as an interactive voice response (IVR) system, a graphical user interface (GUI) including a touchscreen or the like, etc.

Based on one or more of conditions detected according to collected data 115 and/or intended operations determined by the module 106, the computer 105 may provide a message to a steering wheel controller 102 to actuate a vehicle 101 steering wheel 103. For example, the module 106 may determine that the vehicle 101 will be turned to the right or left after traveling a predetermined distance, e.g., 500 feet, or within a predetermined time, e.g., 10 seconds. Upon making such determination, the computer 105 may provide an instruction to the steering wheel controller 102 to actuate movement of the steering wheel 103 to communicate the anticipated future action of the vehicle 101. For example, the steering wheel 103 could be rapidly moved, e.g., rotated, to the right a small distance, e.g., a radial distance of one or two centimeters, several times, e.g., three times, in rapid succession, e.g., thereby providing a directional torque to the driver, or turned 360 degrees to the right, etc. Such rotation of the steering wheel 103 would then inform a vehicle 101 operator that the vehicle 101 will be turning right soon, e.g., in a few seconds, e.g., two, five, ten, etc., seconds.

Exemplary System Elements

A vehicle 101 includes a vehicle computer 105 that generally includes a processor and a memory, the memory including one or more forms of computer-readable media, and storing instructions executable by the processor for performing various operations, including as disclosed herein. Further, the computer 105 may include more than one computing device, e.g., controllers or the like included in the vehicle 101 for monitoring and/or controlling various vehicle components, e.g., an engine control unit (ECU), transmission control unit (TCU), etc.

The computer 105 is generally configured for communications on a controller area network (CAN) bus or the like. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure. In addition, the computer 105 may be configured for communicating with the network 120, which, as described below, may include various wired and/or wireless networking technologies, e.g., cellular, Bluetooth, wired and/or wireless packet networks, etc.

Communications, including instructions to actuate a device may include a message sent, e.g., via a CAN to a controller 102 of a motor or other system that causes motion of a vehicle steering wheel 103. As mentioned above, the computer 105 may provide such instruction to the controller 102 to communicate an anticipated or intended action of the vehicle 101. Accordingly, the instruction to the controller 102 could indicate that the steering wheel 103 should be repeatedly, e.g., two, three, four, etc., times, rotated in rapid succession in a rightward direction, a leftward direction, in alternating rightward and leftward directions, generally for a small radial distance, e.g., one to five centimeters, etc. Further, the computer 105 could instruct the controller 102 that the steering wheel 103 should be caused to vibrate one or more times or according to one or more patterns, e.g., one or more long vibrations, one or more short vibrations, a combination of long and short vibrations, a 180°, 360° rotation, etc.

It will be recognized that because of play in a steering assembly including a steering wheel 103 and/or because movements are relatively small and/or quick, some movements of the steering wheel 103, such as discussed in the preceding paragraph, may often be executed without affecting a vehicle 101 path. Moreover, other, greater, movements of the steering wheel 103 are possible, particularly if the steering wheel 103 is decoupled from a vehicle 101 drivetrain, i.e., can be moved without causing movement of vehicle 101 wheels. For example, a steering wheel 103 could be turned 90 degrees, 180 degrees, etc., purely for the purpose of providing a communication to a vehicle 101 operator, where the steering wheel 103 could be moved without affecting the vehicle 101 path. Larger steering wheel movements, especially if maintained for longer periods of time, will generally affect the trajectory of the vehicle 101 if coupled to the vehicle 101 wheels. In this case, initial steering wheel 103 motions may provide the driver with the opportunity to modulate or altogether cancel an automated driving maneuver if the driver judges that doing so is appropriate given current driving conditions.

Further, sensor data collectors 110 could be used to detect if a driver's hands were on the steering wheel 103, in which case steering wheel 103 motions could be relatively smaller than if the driver's hands were not on the steering wheel 103. Likewise, different emotions, e.g., vibrations, may be appropriate when a driver's hands are on the wheel 103. Yet further, sensor data collectors 110 could be used to detect if a driver's hands were near the steering wheel 103, and were situated so as to interfere with, or impede, movement of the steering wheel 103, whereby the computer 105 could be configured not to actuate a steering wheel 103 movement with which the driver's hand might interfere. For example, where collected data 115 indicates that a driver's hands are situated such that steering wheel 103 movement could injure the driver's hands (e.g., the driver has his or her hands on or near spokes of the steering wheel 103), the computer 105 could be configured to avoid turning the steering wheel 103.

Such movements of the steering wheel 103 can be used, as mentioned above, to communicate anticipated or planned vehicle 101 actions to a human operator. An example already provided includes turning the steering wheel 103 a small distance in one direction or the other to indicate a turn, a lane change, an emergency swerve, etc. Other examples of providing messages or alerts via steering wheel movement may not include making such movement directly related to an anticipated vehicle 101 action. Such alternative or additional examples include providing steering wheel movements that indicate various conditions indicated by collected data 115. For example, an obstacle or object could be detected in a roadway, whereupon a predetermined movement or series of movements of the steering wheel 103 could be provided, e.g., two or more short, rapid vibrations could indicate a possible collision. The steering wheel 103 could be used to indicate hazardous road conditions, such as water, ice, oil, etc., e.g., by a nonlinearity in the steering system (backlash) briefly introduced by means of a drive-by-wire or similar system. For example, steering wheel 103 movements could be made to mimic the presence of a hazardous road condition such as black ice before the hazardous road condition was encountered, e.g., the steering wheel could be made to move back and forth rapidly as if wheels were sliding on ice. Likewise, the steering wheel could be used to indicate that a vehicle 101 is deviating from a predetermined navigation plan established by a global positioning system (GPS) application or the like included in the computer 105 or device 150, that a vehicle 101 is driving on a road shoulder, in a restricted lane, etc., that a vehicle 101 is exceeding a maximum speed limit, or traveling more slowly than permitted by minimum speed limit, etc.

As mentioned above, generally included in instructions stored in and executed by the computer 105 is an autonomous driving module 106. Using data received in the computer 105, e.g., from data collectors 110, the server 125, etc., the module 106 may control various vehicle 101 components and/or operations without a human driver to operate the vehicle 101. For example, the module 106 may be used to regulate vehicle 101 speed, acceleration, deceleration, steering, operation of components such as lights, windshield wipers, etc. Further, the module 106 may include instructions for evaluating information received in the computer 105 relating to vehicle 101 operator characteristics, e.g., from a human machine interface (HMI) and/or data collectors 110.

Data collectors 110 may include a variety of devices. For example, various controllers in a vehicle may operate as data collectors 110 to provide data 115 via the CAN bus, e.g., data 115 relating to vehicle speed, acceleration, etc. Further, sensors or the like, global positioning system (GPS) equipment, etc., could be included in a vehicle and configured as data collectors 110 to provide data directly to the computer 105, e.g., via a wired or wireless connection. Sensor data collectors 110 could include mechanisms such as RADAR, LIDAR, sonar, etc. sensors that could be deployed to measure a distance or closing rate between the vehicle 101 and other vehicles or objects. Yet other sensor data collectors 110 could include cameras, breathalyzers, motion detectors, etc., i.e., data collectors 110 to provide data for evaluating a condition or state of a vehicle 101 operator. In addition, data collectors 110 may include sensors to detect a position, change in position, rate of change in position, etc., of vehicle 101 components such as a steering wheel, brake pedal, accelerator, gearshift lever, etc.

A memory of the computer 105 generally stores collected data 115. Collected data 115 may include a variety of data collected in a vehicle 101. Examples of collected data 115 are provided above, and moreover, data 115 is generally collected using one or more data collectors 110, and may additionally include data calculated therefrom in the computer 105, and/or at the server 125. In general, collected data 115 may include any data that may be gathered by a collection device 110 and/or computed from such data. For example, collected data 115, as mentioned above, may include data concerning a position, change in position, rate of change in position, etc., of vehicle 101 components such as a steering wheel, brake pedal, accelerator, gearshift lever, etc.

The network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115, as well as parameters for evaluating operator input, e.g., parameters for a specific vehicle 101 operator, a specific vehicle 101, particular weather or other environmental conditions, etc. further, the server 125 may store information related to multiple vehicles 101, traffic conditions, weather conditions, etc., within a geographic area, with respect to a particular road, city, etc. The server 125 could also be configured to provide drive-by-wire instructions to vehicles 101 in an autonomous driving area, e.g., a road, etc., such as an "all stop" instruction for all vehicles 101 to stop, a speed restriction, a lane restriction, etc.

A user device 150 may be any one of a variety of computing devices including a processor and a memory, as well as communication capabilities. For example, the user device 150 may be a portable computer, tablet computer, a smart phone, wearable computer or computing device, etc. that includes capabilities for wireless communications using IEEE 802.11, Bluetooth, and/or cellular communications protocols. Further, the user device 155 may use such communication capabilities to communicate via the network 120 and also directly with a vehicle computer 105, e.g., using Bluetooth. Accordingly, a user device 150 may be used to carry out operation herein ascribed to a data collector 110, e.g., voice recognition functions, cameras, etc., in a user device 150 could be used for an HMI to the computer 105, to provide information about a vehicle 101 operator, e.g., age, driving experience, etc.

Exemplary Process Flows

Figure 2:
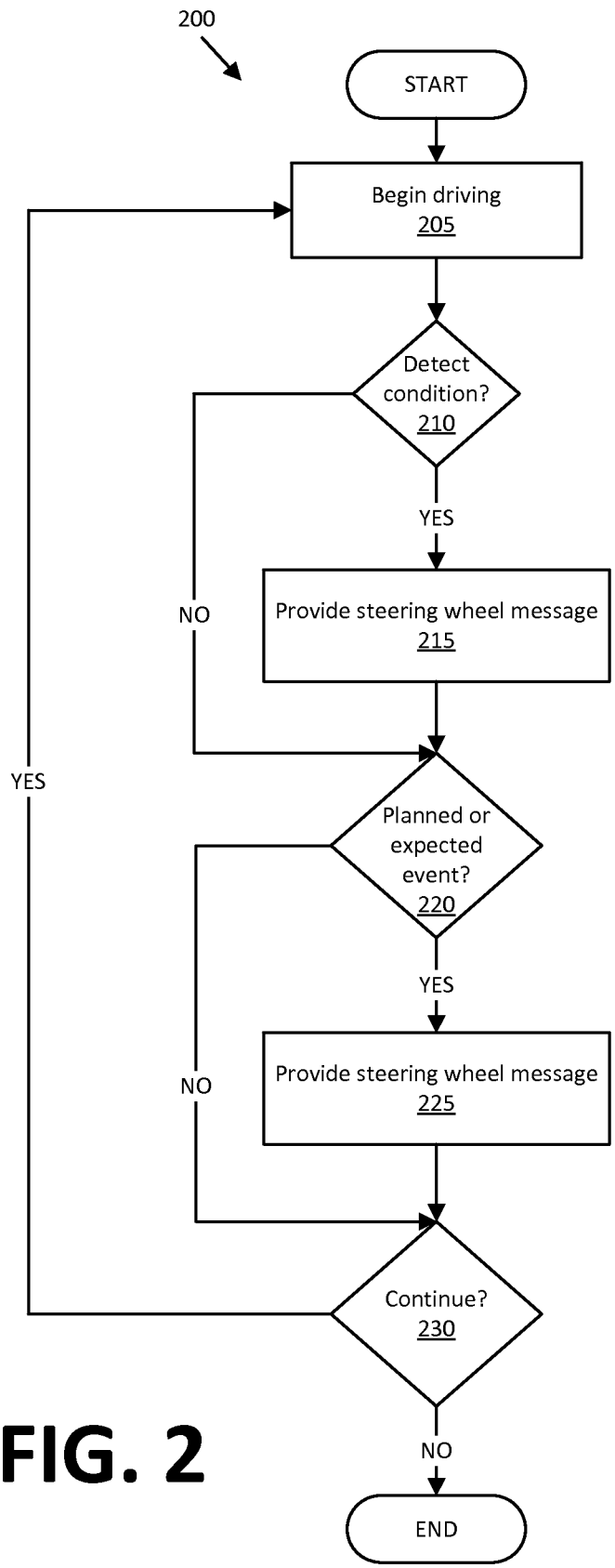
FIG. 2 is a diagram of an exemplary process for or providing messages via steering wheel movements.

FIG. 2 is a diagram of an exemplary process 200 for providing messages via steering wheel movements.

The process 200 begins in a block 205, in which the vehicle 101 commences autonomous driving operations, i.e., begins driving in a manner partially or completely controlled by the autonomous driving module 106. For example, all vehicle 101 operations, e.g., steering, braking, speed, etc., could be controlled by the module 106 in the computer 105. However, it is also possible that the vehicle 101 may be operated in a partially autonomous (i.e., partially manual, fashion, where some operations, e.g., braking, could be manually controlled by a driver, while other operations, e.g., steering, could be controlled by the computer 105.

Next, in a block 210, the computer 105 determines whether a condition has been detected concerning which a message or alert should be provided to a human operator via a vehicle 101 steering wheel 103. For example, as mentioned above, collected data 115 may indicate a variety of such conditions, such as the vehicle 101 being in a restricted lane or off of a roadway, a hazardous driving surface, an obstacle or potential collision, a deviation from a path planned by a navigation system, etc. Alternatively or additionally, the computer 105 may receive data 115 from a remote server 125 indicating a hazardous condition or the like, whereupon a message or alert could be based on such data 115 from the remote server 125. In any event, if such condition is detected, then the process 200 proceeds to a block 215. Otherwise, the process 200 proceeds to a block 220.

In the block 215, the computer 105 sends an instruction, e.g., via a CAN bus or the like, to a controller 102 configured to actuate a motor or the like that can move the steering wheel 103. As mentioned above, the computer 105 may instruct the controller 102 to move the steering wheel 103 in a manner appropriate for a message to be conveyed. Alternatively, the computer 105 may provide a message code, e.g., an alpha, numeric, or alphanumeric code, to the controller 102, whereupon the controller 102 may store an association of a message code with movements of the steering wheel 103 to be performed. Examples of various possible movements of the steering wheel 103 were discussed above. In any event, upon receiving instruction from the computer 105, the controller 102 actuates movement of the steering wheel 103 to convey the requested message.

In a block 220, which may follow either of the blocks 210, 215, the computer 105 determines whether an event is anticipated concerning which a steering wheel 103 message should be provided. For example, an autonomous module 106 could determine that a vehicle 101 will turn right or left within a predetermined period of time or distance, will change lanes, will slow, will stop, will accelerate, etc. If a planned or expected event is identified, then a block 225 is executed next. Otherwise, the process 200 proceeds to a block 230.

In the block 225, the computer 105 sends an instruction to the controller 102 to actuate the steering wheel 103 to provide a message, e.g., in a manner discussed above with respect to the block 215.

In the block 230, which may follow either of the blocks 220, 225, the computer 105 determines whether driving operations are to be continued. For example, user input could be received indicating that driving operations are to be terminated, a vehicle 101 could be powered off, etc. If driving operations are to be continued, then the process 200 returns to the block 205. Otherwise, the process 200 ends.

Conclusion

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer in a vehicle, the computer comprising a processor and a memory, wherein the computer is configured to:
   identify one of a condition affecting the vehicle and a planned action of the vehicle; and
   provide an instruction to actuate movement of a steering wheel in the vehicle, wherein the movement is determined according to, and mimics, the one of the condition and the planned action when the steering wheel is decoupled from a drivetrain of the vehicle.

2. The system of claim 1, wherein the computer is further configured to generate the planned action.

3. The system of claim 1, wherein the computer is further configured to:
   receive data from at least one data collector in the vehicle, and
   determine the condition based on the received data.

4. The system of claim 1, wherein the condition affecting the vehicle is one of a possible collision, a hazardous road condition, a deviation from a predetermined navigation plan, a determination that the vehicle is driving on a road shoulder or restricted lane, and a determination that a speed of the vehicle violates a maximum or minimum speed limit.

5. The system of claim 1, wherein the condition affecting the vehicle is one of acceleration, deceleration, turning, and stopping.

6. The system of claim 1, wherein the computer is further configured to control movement of the steering wheel to mimic steering wheel turning achieved by turning of the vehicle when the steering wheel is not partially or fully decoupled from the vehicle drivetrain.

7. A method, comprising:
   identifying one of a condition affecting the vehicle and a planned action of the vehicle; and
   providing an instruction to actuate movement of a steering wheel in the vehicle, wherein the movement is determined according to, and mimics, the one of the condition and the planned action and the steering wheel is decoupled from a drivetrain of the vehicle.

8. The method of claim 7, further comprising generating the planned action.

9. The method of claim 7, further comprising:
   receiving data from at least one data collector in the vehicle, and
   determining the condition based on the received data.

10. The method of claim 7, wherein the condition affecting the vehicle is one of a possible collision, a hazardous road condition, a deviation from a predetermined navigation plan, a determination that the vehicle is driving on a road shoulder or restricted lane, and a determination that a speed of the vehicle violates a maximum or minimum speed limit.

11. The method of claim 7, wherein the condition affecting the vehicle is one of acceleration, deceleration, turning, and stopping.

12. The method of claim 7, wherein a movement of the steering wheel mimics steering wheel turning achieved by turning of the vehicle when the steering wheel is not partially or fully decoupled from the vehicle drivetrain.

13. A system, comprising a computer in a vehicle, the computer comprising a processor and a memory, wherein the computer is configured to:
   identify one of a condition affecting the vehicle and a planned action of the vehicle; and
   provide an instruction to actuate movement of a steering wheel in the vehicle, wherein the movement is determined according to, and mimics, the one of the condition and the planned action.

14. The system of claim 13, wherein the computer is further configured to generate the planned action.

15. The system of claim 13, wherein the computer is further configured to:
   receive data from at least one data collector in the vehicle, and
   determine the condition based on the received data.

16. The system of claim 13, wherein the condition affecting the vehicle is one of a possible collision, a hazardous road condition, a deviation from a predetermined navigation plan, a determination that the vehicle is driving on a road shoulder or restricted lane, and a determination that a speed of the vehicle violates a maximum or minimum speed limit.

17. The system of claim 13, wherein the condition affecting the vehicle is one of acceleration, deceleration, turning, and stopping.

18. The system of claim 13, wherein the computer is further configured to decouple the steering wheel from a drivetrain of the vehicle, and movement of the steering wheel mimics steering wheel turning expected according to turning of the vehicle when the steering wheel is not partially or fully decoupled from the vehicle drivetrain.

* * * * *